US006224244B1

(12) United States Patent
Burys

(10) Patent No.: US 6,224,244 B1
(45) Date of Patent: May 1, 2001

(54) AUTOMOBILE PANEL DISPLAY ACCESSORY

(76) Inventor: John L. Burys, 7204 S. Sacramento, Chicago, IL (US) 60629

(*) Notice: Subject to any disclaimer, the term of this patent is extended or adjusted under 35 U.S.C. 154(b) by 0 days.

(21) Appl. No.: 09/274,556

(22) Filed: Mar. 23, 1999

(51) Int. Cl.$^7$ ....................................................... B60Q 3/00
(52) U.S. Cl. .............................. 362/489; 362/29; 362/253; 40/725
(58) Field of Search ...................... 40/716, 725; 362/489, 362/29, 109, 253

(56) References Cited

U.S. PATENT DOCUMENTS 2,163,329 * 6/1939 Sipior ..................................... 362/489
5,633,538 * 5/1997 Nickerson ............................. 307/10.8

* cited by examiner

Primary Examiner—Stephen Husar

(57) ABSTRACT

An accessory for a vehicle consisting of a display device that can fit into a DC adapter opening or the cigarette lighter opening in a vehicle dashboard. The display device includes an end portion in which are located an illuminated picture or message and an illuminating device, which receives power from the vehicle electrical source. The display message is disposed in a central opening defined by an end cap and can be readily changed by unscrewing the end cap and inserting other discs in the space between an enlarged end cap and the threaded enlarged portion of the cylindrical body portion of the accessory.

6 Claims, 1 Drawing Sheet

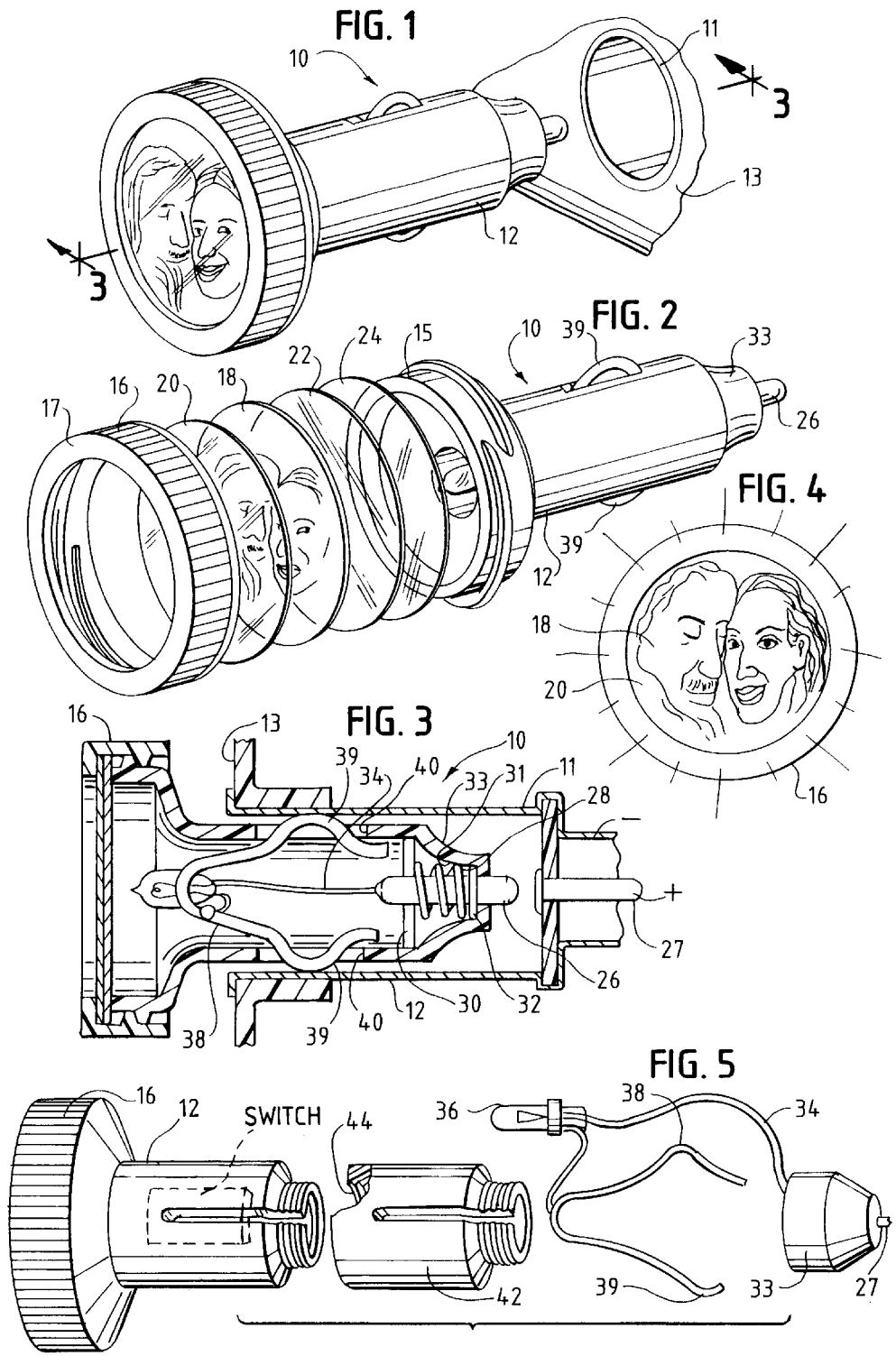

AUTOMOBILE PANEL DISPLAY ACCESSORY

FIELD OF THE INVENTION

The invention relates to an illuminated display accessory that can be mounted in the opening normally provided for a cigarette lighter or a DC adapter outlet in the dashboard of a vehicle such as an automobile or truck.

BACKGROUND OF THE INVENTION

In all vehicles there is normally provided in a dashboard opening a cigarette lighter and/or a DC adapter outlet. This lighter or outlet is supplied with power from the battery of the car and is generally disposed in a position on the dashboard where it is clearly in view and can be readily inserted and removed without distraction. With the advent of the substantial reduction in cigarette smokers the cigarette lighter has come into almost disuse. It can be appreciated that if the cigarette lighter opening can be used for something that the vehicle owner could insert in its place that was attractive he would readily purchase same which item could also simulate an anti-theft device to ward off criminals. It would merely require that the accessory be of a design somewhat similar to a cigarette lighter so that it could be readily inserted into the opening provided for the cigarette lighter in the vehicle dashboard.

SUMMARY OF THE INVENTION

In accordance with the present invention there is provided a novel automobile accessory that can take the place of a conventional cigarette lighter and also use the feature of the cigarette lighter power source to good advantage. The present invention consists of an accessory having a cylindrical body portion that has a diameter the same as the cigarette lighter and includes a head portion in which can be located pictures, signage or other indicia that is viewable and accessible to the occupants of the vehicle. In the illustrated embodiment the accessory is generally cylindrical in nature and has an enlarged head portion containing screw threads onto which a screw cap can be fastened. The shape is not limited to a cylindrical design with the only requirement being that the insertable electrical end be cylindrical. The screw cap has a large central opening through which a picture or the like can be viewed. Such pictures or other indicia can be readily changed by merely unscrewing the cap and placing another disk having a suitable diameter into the space between the cap and the enlarged head portion to hold that which is placed therebetween in position. In the illustrated embodiment there is shown a picture with several colored lens. This device, of course, can be designed to use the power supplied by the vehicle for the cigarette lighter or adapter by supplying power to a bulb through a push button assembly. Thus when the bulb is illuminated the picture will be more visible. As aforementioned, a series of lenses and a cover disc can be inserted to protect the picture from being damaged and provide a desired color orientation depending on the color of the lenses that are being employed. In the preferred embodiment there is provided an extension sleeve with threads at both ends to extend the screw cap display outward of the dashboard opening.

BRIEF DESCRIPTION OF THE DRAWINGS

In the drawings there is illustrated a preferred embodiment of the invention in which:

FIG. 1 is a perspective view of the accessory prior to being inserted into the dashboard of a vehicle;

FIG. 2 is an exploded view showing the cap removed and the disks in spaced position;

FIG. 3 is a cross-sectional view of the accessory;

FIG. 4 is a front view thereof; and

FIG. 5 is an exploded view including an extension sleeve.

BRIEF DESCRIPTION OF THE ILLUSTRATED EMBODIMENT

Referring first to FIG. 1 there is shown an accessory display assembly 10 adapted to be positioned in an opening 11 in the vehicle dashboard. The assembly 10 includes a cylindrical body portion 12, which has a diameter slightly less than the opening 11 in the dashboard 13. The accessory has an enlarged threaded head portion 15 that is designed to receive a screw cap 16 which has corresponding threads to be screwed onto the enlarged head portion 15 of the accessory. The screw cap 16 has an opening 17 through which a picture 18 or indicia means located in the instant accessory can be seen.

As illustrated in FIG. 2 the picture 18 is surrounded by a clear cover disk 20 to protect the picture and located behind the picture 18 are colored lenses 22, 24.

Referring now to FIG. 3 it can be seeing that the lenses and pictures are held in position between the screw cap 16 and the outer portion of the enlarged head portion 15 when the cap is screwed into position. As seen in both FIGS. 2 and 3 the assembly 10 includes a light plunger button 26. When the assembly is fully inserted into the opening 11 the button 26 contacts electrical member 27 which leads to a power source in the vehicle. The plunger button is maintained in its outward position by a spring 28 located between the spring retainer 30 and a flange 31 on the button which engages an inner wall 32 formed on the tapered end portion 33 of the main cylinder body 12. The plunger button 26 provides an electrical connection leading from the electrical source 27 through an electrical wire connector 34 to a bulb 36 which illuminates the display device to provide a bright viewing of the picture 18.

It remains to note that the accessory which as aforementioned has a diameter slightly less than that of the opening 11 has to be resiliently maintained in position in the opening 11 when the accessory is pushed into the dashboard opening 11. To accomplish this there is provided a generally U shaped spring 38 that includes outwardly extending portion 39 that extends outwardly through oppositely disposed openings 40 in the cylinder wall of the cylindrical body 12. The spring 38 is sufficiently flexible that it will be move inwardly as the accessory is pushed into the opening 11 but will maintain a sufficient force outwardly against the wall of the opening 11 to retain the cylinder in whatever position it is pushed relative to the opening 11. The spring 38 further serves to ground the electrical circuit.

Referring now to FIG. 5 there is illustrated a preferred embodiment in which there is provided an extender section 42 having a female threaded portion 44 and a male threaded portion 46. This serves to extend the length of the unit so the screw cap extends further out. It is to be noted that the electrical circuit can include a switch within the cap so when the cap is twisted clockwise the circuit is completed (on) and when turned counter-clockwise the circuit is opened (off). The device can also be made fusible if desired.

It is intended to cover by the following claims all embodiments and modifications that fall within the true spirit and scope of the invention.

What is claimed:

1. An accessory to be inserted into an opening in a vehicle dashboard comprising a housing including an end portion having a hollow cylindrical section and an enlarged open end portion whereby the accessory can be readily grasped for insertion and withdrawal relative to the vehicle dashboard, a cap member defining a central opening, cooperating means for securing the cap to the body open end portion, display means secured between said cap member and the body open end portion and exposed to said cap central opening, bulb means located in the enlarged end portion, which bulb is electrically connected to a resiliently biased plunger button which button is positioned to contact the vehicle power source whereby the display means will be illuminated when inserted into the dashboard opening.

2. An accessory as set forth in claim 1 including an extending section whereby the cap member can extend further outwardly from the dashboard.

3. An accessory as set forth in claim 1 in which the resilient means for maintaining the accessory in the opening in the dashboard consists of a generally U shaped spring defining side portions extending through oppositely disposed openings defined in the body for resiliently contacting the sidewalls of the dashboard opening.

4. An accessory as set forth in claim 3 whereby the display means consists of an assembly including disks at least one of which that displays a picture or a message.

5. An accessory as set forth in claim 4 in which the assembly also includes a clear transparent cover disk, a picture or message disk, and one or more color lens to provide a variety of illuminated effects.

6. An accessory as set forth in claim 1 in which there is a switch means located inside said cap whereby when the cap is turned in one direction the illumination means will light up and if turned in the opposite direction the illumination means will be turned off.

* * * * *